June 25, 1935.    P. RILEY    2,006,250
CHANGE SPEED MECHANISM
Filed Oct. 12, 1934    2 Sheets-Sheet 1

INVENTOR
Percy Riley
BY
Mawhinney & Mawhinney
ATTORNEYS.

June 25, 1935.  P. RILEY  2,006,250
CHANGE SPEED MECHANISM
Filed Oct. 12, 1934   2 Sheets-Sheet 2

INVENTOR
Percy Riley
BY
Mawhinney & Mawhinney
ATTORNEYS

Patented June 25, 1935

2,006,250

UNITED STATES PATENT OFFICE 2,006,250

CHANGE SPEED MECHANISM

Percy Riley, Coventry, England

Application October 12, 1934, Serial No. 748,120
In Great Britain October 12, 1933

3 Claims. (Cl. 74—334)

This invention relates to change-speed mechanism, particularly for motor-vehicles, of the kind where the speed changes can be pre-selected by a change-speed or selector control, the different "speeds" only being introduced on the operation of a main control which may be the pedal of a main friction clutch. It relates particularly to such change-speed mechanism where springs are loaded on the movement of the selector control, the springs serving for moving striking forks or other elements of the mechanism only on the operation of the main control.

The main object of the invention is to provide an improved arrangement of this kind which will be inexpensive to manufacture, silent in operation and adapted for long life.

In applying the invention in practice, the change-speed mechanism could theoretically be one in which all the different "speeds" were introduced by the sliding of gears or dog clutches into and out of mesh with co-operating elements, in which case use would preferably be made of a free-wheel or other supplementary form of clutch at the end of the mechanism remote from that where the main external clutch, if used, would be. Alternatively, the mechanism could be one in which some or all of the different "speeds" are introduced by synchronizing means or by means of friction clutches inside the gear-box. In a preferred method, however, the invention is applied to a change-speed mechanism of the kind comprising two portions in series, that which is remote from the main friction clutch (when such is associated with the change-speed mechanism) being an "easy change" portion, preferably adapted for control as described in the specification accompanying my co-pending patent application No. 748,121, filed October 12, 1934.

Figure 1:
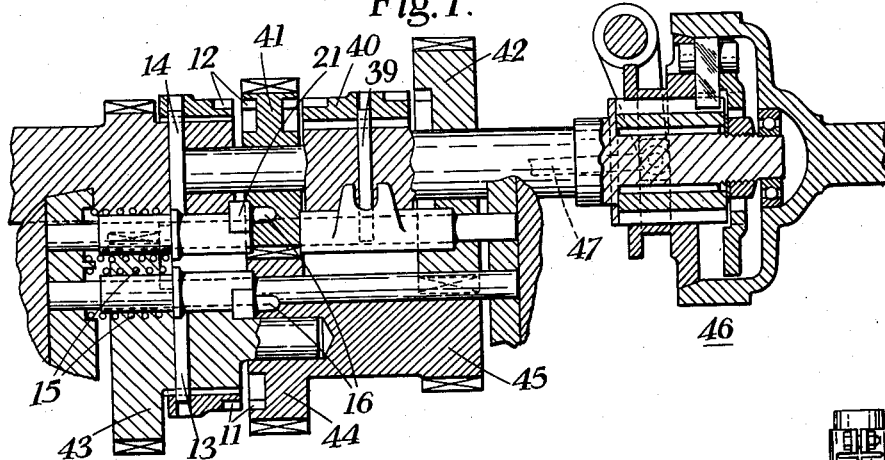
Figure 1 is a part-sectional elevation of one form of change-speed mechanism with two portions in series and with a subsidiary clutch at the tail end of the change-speed mechanism (this subsidiary clutch constituting, with the adjacent part of the mechanism, an "easy change" portion), to which the invention can be applied.
Figure 3:
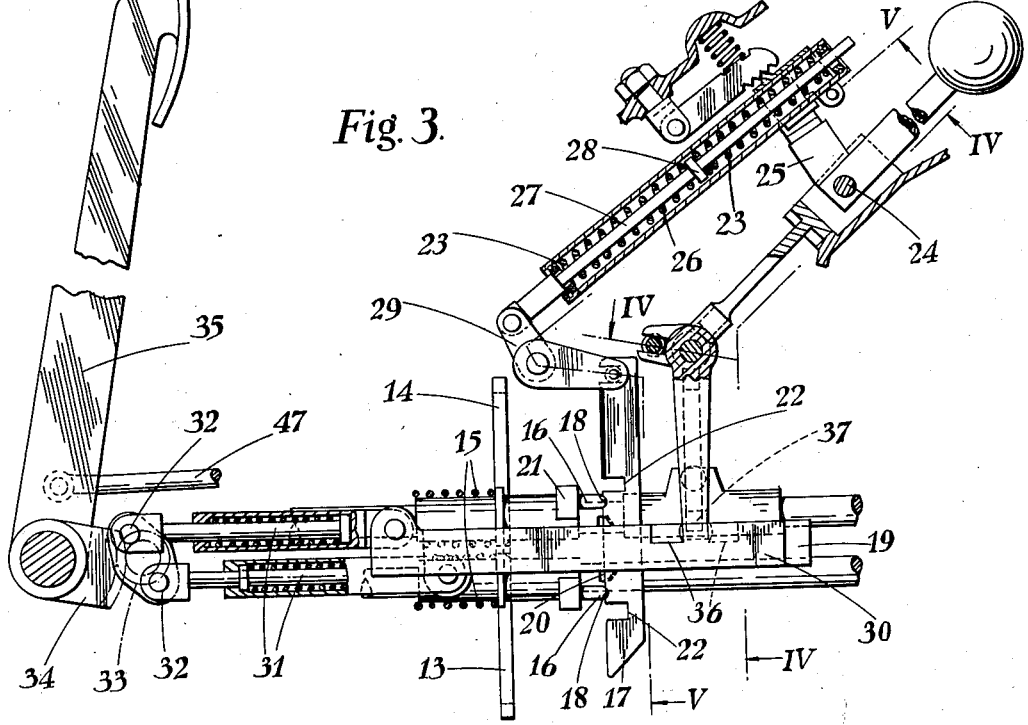
Figure 3 is a part-sectional elevation of the preselective control of the mechanism of Figures 1 and 2.

In the construction illustrated, the dog clutches 11, 12 are engaged by movement of individual striking forks 13, 14, in the same direction—i. e., to the right (Figures 1 and 3). The dog clutch 11 must be engaged for 1st and 3rd "speed", and the dog clutch 12 for 2nd and 4th "speed". The independent striking forks 13, 14, which are arranged alongside one another, are spring biassed, as shown at 15, in clutch-engaging direction, and they constitute that previously referred to as the "introducing means." However, they have pin portions 16, 16 which co-operate with a slidable selector bar 17 so that they cannot, in ordinary conditions, move under the applied bias in engaging direction. Further, they engage notches 18 in this bar or otherwise co-operate with it so that it cannot be slid in ordinary conditions. However, the sliding rod 19 is formed with shoulders 20 adapted to co-operate with projections 21 of these striking forks so that as a main control is actuated (the pedal for the main external clutch in the present instance), when the rod 19 is drawn to the left (Figure 3) the striking fork pins 16 will be withdrawn clear of the selector bar. This may then move in whichever direction has been selected so that on the release of the main control (the clutch pedal) the pin 16 on the appropriate striking fork can pass into a recess 22 in the selector bar, allowing the associated dog sleeve to engage.

The selector bar is connected with the change-speed or selector control through oppositely-acting springs 23, 23 so that movement of the control to a new gear position biases the selector bar to move in the appropriate direction; which it will do when it has been released by the striking fork pins 16 as aforesaid. Figure 3 shows the parts in the neutral position. The selector control is pivotally mounted at 24 for movement in a vertical plane and is formed with a crank 25 hinged to the cylindrical casing 26. This encloses the rod 27 having the springs 23 disposed on opposite sides of its collar 28, the rod 27 being connected with the selector bar by the bell-crank 29. Thus, movement of the selector control clockwise (Figure 3) will compress the bottom spring 23, so that when the selector bar is released it will be depressed to align the upper notch 22 and pin 16 necessary for the movement of the striking fork 14 to effect engagement of the dog clutch 12. And vice versa. In each case the engagement of either of the dog clutches is effected by the associated spring 15 when the sliding rod 19 is returned to move its shoulders 20 away from the striking fork projections 21.

Figure 4:
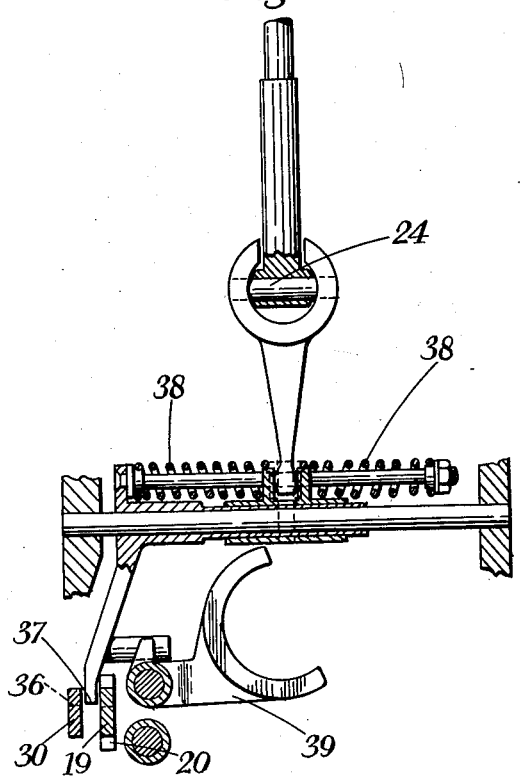
Figures 4 and 5 are cross-sectional elevations of the control taken on the lines IV—IV and V—V of Figure 3, respectively.
Figure 5:
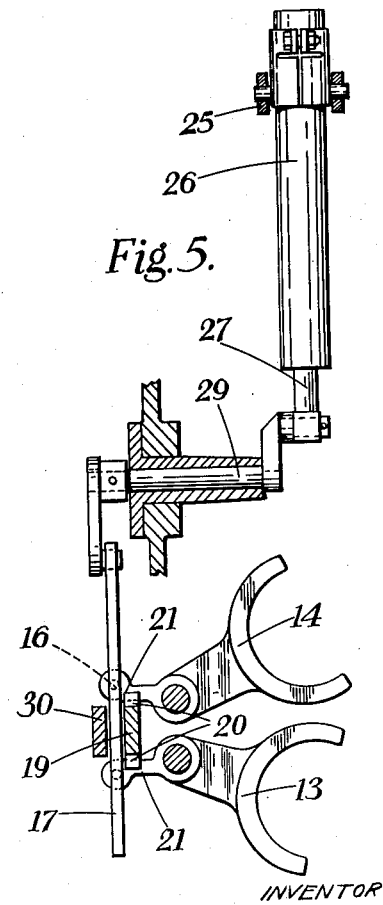
Figure 2:
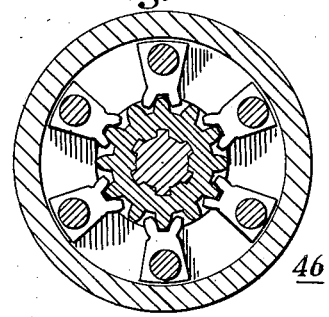
Figure 2 is a cross-section of this subsidiary clutch.

The sliding rod 19 and the adjacent sliding rod 30 are connected through telescopic spring-pressed connections 31, 31 to diametrically-opposite pins 32 on a part carried by a pinion 33—as described in the specification aforesaid. This pinion meshes with a toothed quadrant 34 actuated by the main clutch pedal 35, which is shown in the off (clutch-engaged) position and is also the main gear control. In these conditions the notches 36, 36 in the rods 19, 30 are not aligned with one another. When the clutch pedal is depressed fully these notches are brought into alignment with one another and with the operating stem 37, the depression of the clutch pedal serving to move the rod 19, to the left (as previously stated) and the rod 30 to the right (Figure 3). The operating stem 37 is movable into either of the notches 36 by the springs 38, 38 which can be selectively biassed by the movement through the gate of the selector control. Thus, movement of the latter so as to compress the right-hand spring 38 (Figure 4) causes the operating stem 37, when able to do so, to enter the notch 36 in the sliding rod 19. Movement of the selector control in the other direction will, when conditions are appropriate, cause the operating stem 37 to enter the notch 36 of the sliding rod 30. As the operating stem 37 acts on the striking fork 39 of the double-ended clutch sleeve 40, its movement to the right or left (Figure 3) on the release of the clutch pedal, according to which of the notches 36 it engages, effects a corresponding movement (Figure 1) of the double-ended clutch sleeve 40. When to the left 3rd or 4th "speed" is brought into train, and when to the right 1st or 2nd "speed."

In the gear-box illustrated, the gears 41 and 42 are free on the driven shaft, and the gear 43 can be clutched to the gear 44 which is fast with the gear 45. The double-ended clutching member 40 is slidably splined on the driven shaft, the clutch sleeve 12 is slidably splined on the driving shaft, and the clutch sleeve 11 is slidably splined on the hub of the gear 43. The subsidiary clutch 46 is of a known type. It is connected by the rod 47 with the clutch pedal 35 so as to be freed by the full depression of the latter after the main clutch has been withdrawn and re-engaged on the release of the main clutch before the latter is engaged.

Thus, by means of the invention, the change-speed or selector control, which is preferably arranged to extend from the facia board and to work in a gate in a well understood manner, can at any time be moved to a new gear position, and on the depression of the main clutch pedal first the main clutch and then the subsidiary clutch 46 is released, then the double-acting clutch sleeve 40 is brought to the neutral position and the previously-engaged dog sleeve 11 or 12 is withdrawn, and then the selector bar moves to the position to which it was biassed and the operating stem 37 moves to the selected notch 36. On release of the main clutch pedal the appropriate dog sleeve 11 or 12 engages, the clutch sleeve 40 is moved in the appropriate direction, and finally the subsidiary clutch and then the main clutch is engaged. The change-speed lever can be moved silently from one gear position to another while the main clutch is fully released, or at any time.

Although the invention is particularly described above in connection with the form of gear-box of the aforesaid specification, it should be clearly understood that the invention is applicable to other forms.

What I claim as my invention and desire to secure by Letters Patent of the United States is:—

1. A preselective change-speed mechanism comprising two portions in series, a common selector control, one portion having a striking fork operable as a result of the lateral movement of the selector control and the other portion having a striking fork operable as a result of a movement of the selector control in another direction, connections between the portions and the selector control whereby movements of the selector control load springs by which the necessary movement of the striking forks is effected, a main control, and means whereby the necessary movement of the striking forks is effected only on the operation of the main control.

2. A preselective change-speed mechanism comprising two portions arranged in series, one portion having clutch-engaging means biassed in engaging direction, a selector bar, a selector control connected for biassing the selector bar for movement to select, the clutch-engaging means co-acting with the selector bar to prevent its movement, and a main control for moving the clutch-engaging means to release the selector bar, and the other portion having an operating stem which can be selectively biassed by the selector control, and means whereby the stem is movable in the operating direction only on the operation of the main control.

3. Transmission mechanism comprising a main clutch, a main control therefor, a change-speed mechanism having two portions in series, a selector control, a selector bar, a resilient connection between the selector control and bar whereby movement of the selector control applies a bias to the bar, sliding means for actuating one portion of the change-speed mechanism, said sliding means co-acting with the selector bar to prevent its movement under the bias, means connecting the main control with said sliding means whereby the latter is actuated on the release of the main clutch to release the selector bar, the latter when released co-acting with said sliding means when the main control is actuated to effect engagement of the main clutch, sliding means for actuating the other portion of the change-speed mechanism, a stem for actuating the second-mentioned sliding means, a resilient connection between the selector control and the stem whereby movement of the selector control biases the stem for movement in a selected direction, and connections between the stem and main control whereby the stem can move in the direction selected only when the main control is actuated to release the main clutch and whereby the stem is moved to actuate the second-mentioned sliding means as the main control is being actuated to effect engagement of the clutch.

PERCY RILEY.